United States Patent
Antos et al.

(10) Patent No.: US 6,289,698 B1
(45) Date of Patent: *Sep. 18, 2001

(54) METHOD OF MAKING A FIBER PREFORM WITH INCREASES IN ALUMINA CONCENTRATION AT RADIAL DISTANCES

(75) Inventors: A. Joseph Antos, Elmira; Polly W. Chu, Painted Post, both of NY (US)

(73) Assignee: Corning Incorporated, Corning, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/872,911

(22) Filed: Jun. 11, 1997

Related U.S. Application Data

(60) Provisional application No. 60/022,980, filed on Aug. 2, 1996.

(51) Int. Cl.$^7$ ................................................. C03B 37/023
(52) U.S. Cl. ................................. 65/385; 65/390; 65/427; 65/111; 65/117; 65/421; 65/413
(58) Field of Search ........................... 65/385, 390, 413, 65/427, 429, 117, 111, 399, 421, 422, 412

(56) References Cited

U.S. PATENT DOCUMENTS

| | | |
|---|---|---|
| 3,806,570 | 4/1974 | Flamenbaum et al. . |
| 3,868,170 | 2/1975 | DeLuca . |
| 4,032,315 | 6/1977 | Van der Steen . |
| 4,263,031 * | 4/1981 | Schultz ................................... 65/428 |
| 4,566,754 | 1/1986 | Beales et al. ........................ 350/96.3 |
| 4,737,179 | 4/1988 | Tanaka et al. . |
| 4,747,663 | 5/1988 | Huber ................................. 350/96.33 |
| 4,820,018 | 4/1989 | Melman et al. ................... 350/96.33 |
| 4,848,998 * | 7/1989 | Snitzer . |
| 4,923,279 | 5/1990 | Ainslie et al. . |
| 4,978,378 | 12/1990 | Ito et al. . |
| 5,049,175 * | 9/1991 | Röss . |
| 5,058,976 | 10/1991 | Digiovanni et al. . |
| 5,059,229 | 10/1991 | Blankenship et al. ..................... 65/2 |
| 5,078,092 | 1/1992 | Antos et al. .......................... 118/726 |
| 5,078,768 | 1/1992 | Aggarwal et al. . |
| 5,151,117 * | 9/1992 | Bartholomew ....................... 65/427 |
| 5,155,621 | 10/1992 | Takeda et al. . |
| 5,246,475 * | 9/1993 | Edagawa ............................... 65/901 |
| 5,262,365 * | 11/1993 | Oyobe .................................... 501/54 |
| 5,278,850 | 1/1994 | Ainslie et al. . |
| 5,282,079 | 1/1994 | Laming et al. . |
| 5,356,449 * | 10/1994 | Kuwahara . |
| 5,681,365 | 10/1997 | Gilliland et al. ....................... 65/377 |
| 5,838,866 | 11/1998 | Antos et al. ......................... 385/127 |

FOREIGN PATENT DOCUMENTS

| | | |
|---|---|---|
| 0 428 068 A1 | 5/1991 | (EP) . |
| 0 613 866 | 9/1994 | (EP) . |
| 2 082 568 | 3/1982 | (GB) . |
| 2203737 | 10/1988 | (GB) . |

OTHER PUBLICATIONS

K.T. Nelson et al., "Influence of Trace Amounts of Germania on the Loss Performance of Silica Core Fibers", OFC/IOOC/Wednesday Morning/137 1987.

Y. Hibino et al., "Consolidated–Atmosphere Influence on Drawing–Induced Defects in Pure Silica Optical Fibers", Journal of Lightwave Technology, vol. 6, No. 2, Feb. 1988, pp. 172–178.

* cited by examiner

*Primary Examiner*—John Hoffmann
(74) *Attorney, Agent, or Firm*—Timothy R. Krogh; William J. Simmons, Jr.; David L. Berdan

(57) ABSTRACT

A sintered dense glass, alumina-doped optical fiber preform is stretched and is then heated to a temperature of 1490–1495° C. to remove bubbles without causing crystallization. Thereafter, the stretched glass body is either drawn directly into an optical fiber or overclad and then drawn into a fiber.

14 Claims, 3 Drawing Sheets

METHOD OF MAKING A FIBER PREFORM WITH INCREASES IN ALUMINA CONCENTRATION AT RADIAL DISTANCES

This application claims benefit to U.S. provisional application 60/022,980 filed Aug. 2, 1996.

BACKGROUND

This invention relates to a method of making elongated bubble-free glass articles, and more particularly to a method of making optical fibers, especially gain fibers that are employed in fiber amplifiers.

So-called outside processes, which include the outside vapor deposition (OVD) method and the vapor axial deposition (VAD) method, produce homogeneous and optically excellent glass preforms; moreover, these methods are cost efficient because preforms of large dimensions can be produced. Both OVD and VAD methods employ burners to react precursor materials such as halides and organometallic compounds to produce a stream of glass particles or soot.

In the OVD process the soot stream deposits on the outer peripheral surface of a mandrel and builds up radially to form a porous body. After the mandrel has been removed from the porous body, it is inserted into a consolidation furnace where it is dried and sintered. A chlorine containing gas mixture is flowed through the furnace to the heated preform to dry the porous body. Helium is then flowed through the furnace and also into the preform aperture to remove residual chlorine and maintain an open centerline in the core perform during sintering at temperatures that are usually in the range of 1440–1525° C. for high silica content glass. The resultant dense glass preform can be immediately drawn into an optical fiber if it contains the proper ratio of core and cladding glass. The dense glass preform often contains no cladding glass or only a portion of the required thickness of cladding glass. Such preforms are inserted into a draw furnace where the longitudinal aperture is evacuated while the tip thereof is heated and stretched into an elongated rod. The aperture closes and forms a "centerline collapse region". The rod can be severed into core canes that are overclad with additional cladding glass to form draw blanks that are drawn into optical fiber.

In the VAD process the soot stream deposits on the end of a target rod and builds up axially to form a porous body that is similar to that produced by the OVD process except that it has no axial aperture. Therefore, the dense glass VAD preform has no centerline collapse region. The remainder of the fiber producing process is similar to that described above in that the porous body is dried, sintered to dense glass, and drawn into fiber.

Some helium to which the porous body is subjected in the consolidation furnace remains in the glass in molecular form, i.e. no bubbles can be seen. Germania-containing, bubble-free overclad draw blanks have been held in 800° C. ovens to outgas any trapped helium molecules and improve fiber drawability. However, some draw blanks contain visible gas bubbles that contain helium and/or other inert gases and, in some instances, additionally contain oxygen. Fibers drawn from blanks containing bubbles break or experience diameter variations during drawing. If only short lengths of fiber are needed, fiber can be drawn between bubbles; however, initiating the draw start-up process each time the fiber breaks is costly and time-consuming. A draw blank containing bubbles that are spaced along its length can be essentially useless if long lengths of transmission line fiber are to be drawn from it.

Optical fibers doped with rare earths such as erbium are commonly used in fiber amplifiers. The cores of such gain fibers usually contain $GeO_2$ to increase refractive index. Alumina is advantageously added to the core to secure such improvements as reducing gain ion clustering and sometimes for improving the shape of the gain spectrum. It might therefore seem to be desirable to use alumina rather than germania in amplifier fibers to achieve the desired optical characteristics including increasing core refractive index. However, alumina causes crystallization problems. Standard OVD and VAD sintering temperatures produce crystallization in blanks containing more than some maximum permissible alumina concentration, depending upon glass composition and processing conditions (see U.S. Pat. No. 5,262,365). A nucleation site for such crystallization appears to include the centerline collapse region of sintered OVD preforms. Crystallization can promote trapping of gases. Bubbles composed of helium and oxygen have been routinely observed in alumina doped sintered glass preforms.

According to the $SiO_2$—$Al_2O_3$ equilibrium phase diagram, the porous soot body must be sintered above the eutectic temperature of 1587° C. to avoid crystal nucleation and growth. That exceeds the operating temperature of silica based muffles. Although crystals can be melted in furnaces at temperatures above the eutectic point for mullite and cristobalite as evidenced by the $Al_2O_3$—$SiO_2$ equilibrium phase diagram, the resulting glass has unacceptably high bubble density and poor drawability or is undrawable.

Essentially bubble-free draw blanks are needed for drawing long lengths of distributed fiber amplifier fiber. Only relatively short lengths of rare earth doped fibers are needed for discrete fiber amplifiers. However, the fibers must be free of defects such as bubbles composed of trapped gasses (also referred to as seeds). Even if lengths of discrete gain fiber can be drawn between bubbles, the process becomes costly when the draw blank contains too many bubbles.

Attempts have therefore been made to reduce the occurrence of bubbles and crystallization in draw blanks. Dopants such as fluorine and $P_2O_5$ have been added to the core to reduce the risk of crystallization by the alumina. However, adding additional dopants can increase cost, and the presence of such dopants in the core is usually undesirable.

Therefore, a process is needed whereby bubble-free or low bubble content alumina containing dense glass draw blanks can be produced without introducing additional undesirable dopants into the core region.

Prior art processes typically have the alumina at a maximum at the centerline. See U.S. Pat. Nos. 4,923,279; 5,058,976; and 5,155,621 where the concentration of alumina is highest at the center of the core. In the '279 patent alumina is used to adjust the refractive index of the fiber and also inhibit loss of fluorescent dopant during processing. In the process disclosed in the '976 patent the core has regions beginning with the center having alumina and germania, followed by a subsequent region comprising erbium and alumina and then a third region comprising only germania dopant. The erbium is not at the center but is in an annular ring of a radius about half that of the core. The erbium diffuses into the central alumina layer but does not reach the center of the fiber. In the '621 patent alumina is limited to the center of the core and erbium is uniformly doped through the whole body of the core. It is reported that such an arrangement reduces spontaneous emissions. OVD produced draw blanks having this type of alumina concentration profile are especially at risk of crystallization at the centerline collapse region.

SUMMARY

It is therefore an object of the invention to provide a method of reducing the occurrence of bubbles in optical fiber draw blanks. Another object is to provide an optical fiber draw blank having an alumina concentration gradient that reduces the risk of crystallization, especially in OVD produced draw blanks.

Briefly, the present invention relates to a method for reducing bubbles in a glass article. Glass soot is deposited on a substrate to form an elongated cylindrical body, at least a portion of which is porous. The porous portion of the body is dried and sintered to convert the porous portion to a dense glass having a given cross-sectional area. The resultant glass preform is drawn to form a glass cane in which the cross-sectional area of the sintered dense glass is less than the given cross-sectional area. The cane is heat treated at a high enough temperature to remove bubbles and for a short enough time to avoid crystallization of the cane.

This method can be used to improve glass canes produced by processes such as OVD, VAD and the solution doped MCVD process. In the OVD process, the step of depositing comprises depositing glass soot on the outer peripheral surface of a mandrel to build up a porous coating, and removing the mandrel. In the VAD process, the step of depositing comprises depositing glass soot on the end of a target rod and building up the coating in an axial direction. In the MCVD-based process, the step of depositing comprises depositing glass soot on the inner surface of a substrate tube.

In an embodiment useful in the OVD and VAD processes, glass soot is deposited on a substrate to form a porous, elongated cylindrical body having a first outer diameter. The porous body is dried and sintered to consolidate the porous body into a preform having a second diameter that is less than the first outer diameter. The preform is drawn to form a core cane having a third diameter that is less than the second diameter. The resultant cane is then heat treated.

The method of the invention is especially useful for making gain fibers for fiber amplifiers by the OVD process. Such fibers employ a rare earth such as erbium; alumina is also present to prevent clustering of the rare earth ions. Glass canes formed by this process can exhibit crystallization in the centerline collapse region when the alumina content is too high. The method therefore includes the step of depositing a plurality of layers of soot on a mandrel to build up a coating, one or more of the first deposited layers of soot containing a first concentration of alumina. The alumina concentration of the remainder of the plurality of layers is greater than the first concentration.

DETAILED DESCRIPTION

Figure 1:
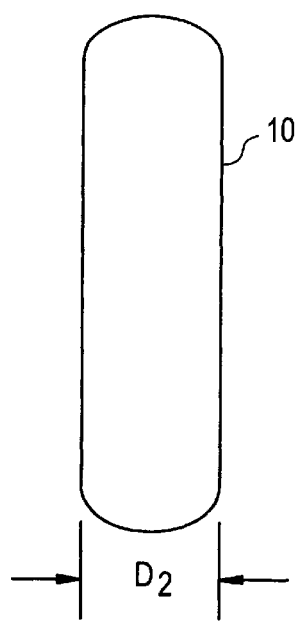
FIG. 1 shows a sintered glass body produced by an outside process.
Figure 2:
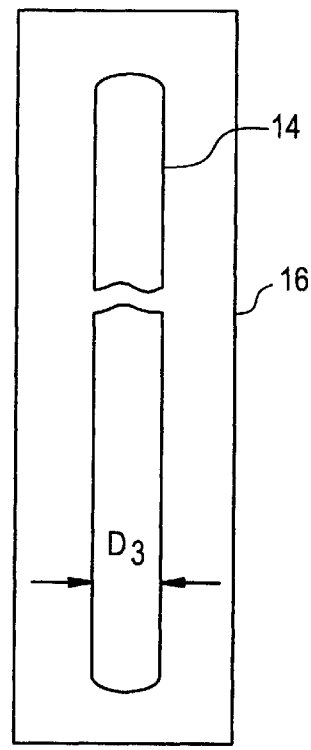
FIG. 2 schematically illustrates the heat treatment of the body of FIG. 1 after it has been stretched.

FIGS. 1 and 2 schematically illustrate the principle of the present invention. An elongated porous soot body is formed by an outside process such as the OVD or VAD process. The soot body is dried and sintered to form the dense glass preform 10 having an outside diameter $D_2$. Preform 10 may contain bubbles that would adversely affect the fiber drawing process and/or the resultant fiber. It is therefore desirable to eliminate or reduce the number of bubbles in the glass. Heat treating preform 10 has not always resulted in a reduction in bubble count.

In accordance with this invention preform 10 is drawn or stretched by known techniques to form a glass cane 14 of reduced diameter $D_3$. Thereafter, cane is 14 subjected to heat treatment in furnace 16. Furnace 16 can uniformly heat cane 14 along its entire length for a controlled time. Alternatively, the length of the cane could be incrementally heat treated by a scanning-type furnace or by gradually inserting the cane into a furnace having a narrow hot zone. Regardless of furnace type, each length segment of the cane is heated to a sufficiently high temperature for a sufficient length of time to remove or decrease the number of bubbles therein. The small diameter core cane 30 as compared to that of the sintered preform makes it easier for gases in the bubbles to escape. The diameter $D_3$ is preferably in the range of 5–10 mm to achieve this result. The structural integrety of canes having diameters less than about 5 mm would render them difficult to use if they were long in length. Diameter $D_3$ could be smaller than 5 mm if only short lengths of cane were going to be overclad and drawn into fiber.

It is believed that the key factors that influence the successful removal of the bubbles include temperature, treatment duration, bubble size, and gas composition. A given temperature and a given treatment duration may be adequate for removing bubbles from a cane having a given composition. If treatment duration is decreased, temperature must be correspondingly increased to achieve a similar result. Similarly, a successful process may include inserting a cane through the hot zone of a furnace at a given rate. If the rate is increased, the temperature should also be increased.

Various factors influence the treatment temperature. Alumina containing glasses tend to crystalize. Therefore, the temperature needs to be sufficiently high and the duration at the high temperature needs to be sufficiently short to avoid crystallization and crystal growth and yet remove bubbles from such glasses. For alumina doped glass, the avoidance of crystallization is enhanced by quickly cooling the heat treated cane. This can be accomplished by quickly removing the cane from the furnace at the conclusion of heat treatment. Bubbles were successfully eliminated in silica glass canes doped with germania and up to about 2.35 wt. % alumina by passing the canes through a furnace hot zone at approximately 1440–1500° C. When the alumina concentration was increased to an amount greater than about 2.35 wt. %, an undesirable amount of crystallization was observed. While less crystallization is observed in such larger alumina concentration canes after they are held at lower temperatures (1100–1300° C.) for about two hours, such lower temperatures did not reduce the number of bubbles.

The above disclosed heat treatment benefits are not limited to alumina doped glasses but are also applicable to other compositions that either do or do not form crystals during processing. Such compositions include dopants such as germania which is the most extensively used refractive index increasing dopant. When heat treating germania containing canes, the temperature should not exceed 1725° C., the decomposition temperature of germania. If the treatment temperature is sufficiently high to decompose germania, pre-existing bubbles can even increase in size.

Another limitation on the process is deformation of the cane by stretching. In an embodiment wherein the canes were heated to 1495–1550° C. and insertion rate was about 6 mm/minute, the canes stretched about 0.25 mm, an acceptable amount. However, another process run at a temperature of 1845° C. and an insertion rate of 15 mm/minute resulted in the formation of an unacceptable stretched cane having a diameter that tapered from 7 mm to 3.9 mm.

This invention is especially suitable for making optical fibers. However, it may be used for bulk specimens of glass as well. For example, glass rods made by an outside deposition process can be severed into small pieces that are formed into optical devices such as lenses, windows, prisms and the like. The sintered dense glass preform can be stretched and heat treated prior to forming the optical devices.

The heat treatment process of this invention is especially suitable for use in conjunction with fiber amplifier core canes made by the OVD process. Core canes were formed of silica doped with germania, alumina and erbia. Precursor materials employed to form these oxides are listed in Table 1.

TABLE 1

| Oxide | Reactant (s) |
| --- | --- |
| Erbia | Er (FOD)$_3$ |
| Alumina | AlCl$_3$ and Al (HFA)$_3$ |
| Germania | GeCl$_4$ |
| Silica | SiCl$_4$ |

Figure 3:
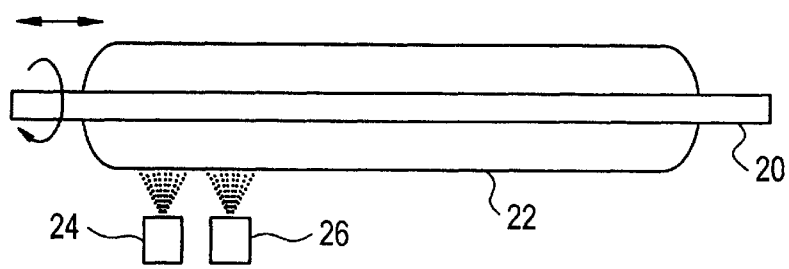
FIG. 3 illustrates the deposition of glass soot on a mandrel.
Figure 4:
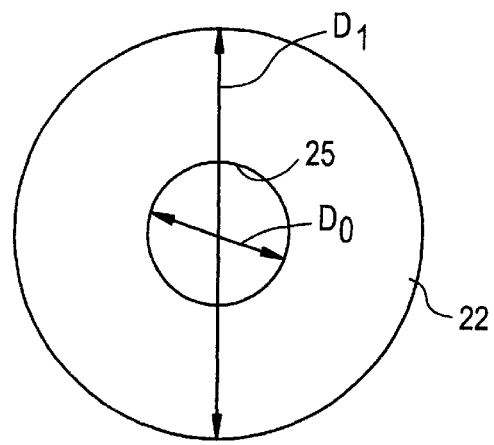
FIG. 4 is a cross-sectional view of the porous body after the mandrel has been removed.
Figure 5:
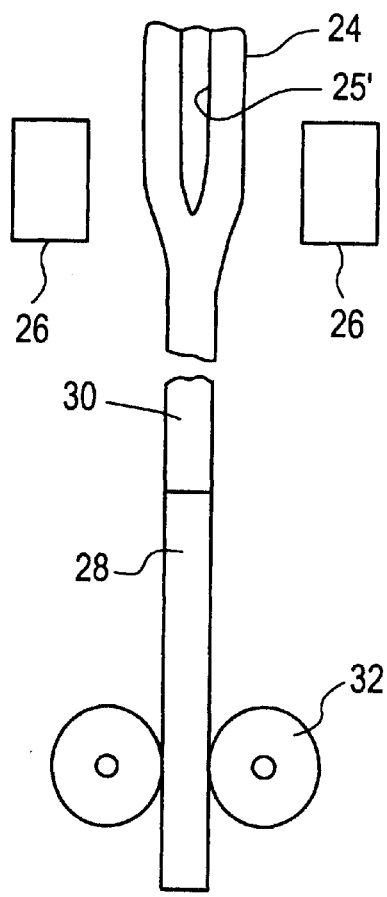
FIG. 5 schematically illustrates the drawing of a rod or cane from a sintered dense glass preform.

Referring to FIGS. 3–5, there are shown a series of schematic diagrams illustrating an OVD method of producing a core cane. Those skilled in the art are knowledgeable of the individual steps in this process, and only those portions of the process that are necessary to explain the features of invention are repeated here. For further detailed descriptions of the outside vapor deposition process those skilled in the art are referred to U.S. Pat. Nos. 4,453,961, 5,043,002, 5,211,732, 4,906,267, and 4,251,251, the entire disclosures of which are incorporated herein reference.

FIG. 3 shows an OVD deposition system wherein glass soot streams from burners 24 and 26 are directed toward mandrel 20 to deposit thereon a porous glass soot body 22. Two burners are illustrated; deposition runs were made using one or two burners. When two burners were employed, a first burner was supplied with Er(FOD)$_3$ and Al(HFA)$_3$ or AlCl$_3$, and the second burner was supplied with SiCl$_4$ and GeCl$_4$. The alumina precursor was sometimes fed to the second burner rather than the first. The mandrel is removed to form a porous soot body 22 having an axial aperture 25. The inner and outer diameters are $D_0$ and $D_1$, respectively. In the next step (not shown), porous soot body 22 is dried and sintered to provide a dense glass preform 24. Sintered preform 24 has an outer diameter $D_2$ that is substantially less than the diameter $D_1$ of the porous soot body 22. The diameter $D_0$ of axial aperture 25' is smaller than aperture 25 but is still recognizable.

The dense glass preform 24 is then mounted in a conventional draw furnace where the tip thereof is heated by heating means 26 (see FIG. 5). A high helium content gas typically flows through the furnace muffle. A glass rod 28 may be attached to the bottom of preform 24. Tractors 32 pull rod 28 downwardly, thereby drawing a rod-shaped core cane 30. A vacuum fixture (not shown) is attached to the top end of preform 24. As cane 30 is drawn, aperture 25 readily closes since the pressure therein is low relative to ambient pressure. Core cane 30 has a diameter $D_3$ that is less than $D_2$. In one embodiment, $D_2$ was approximately 38 mm, and $D_3$ was approximately 7 mm, whereby $D_3$ is less than 20% of $D_2$. Core cane 30 is sufficiently long that it is typically severed into a plurality of sections.

Figure 6:
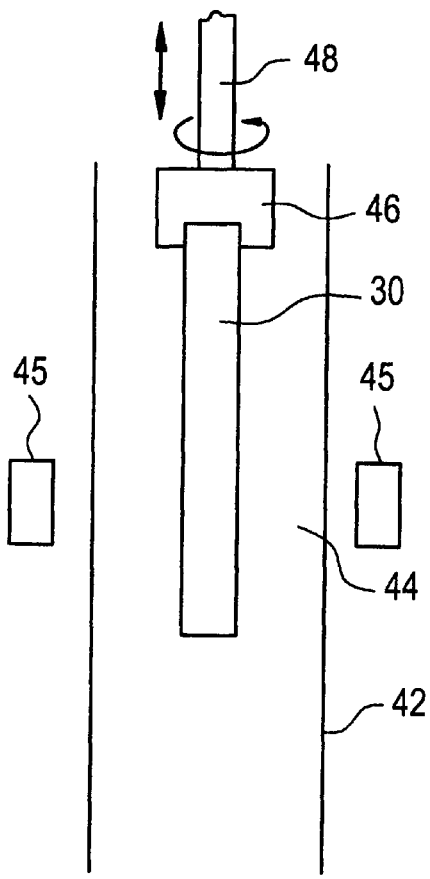
FIG. 6 shows the cane during heat treatment in a furnace hot zone.

In the most successful mode of operation, the cane 30 was heated in a furnace 42 (FIG. 6). The furnace hot zone 44, which was generated by heating means 45, was maintained at a temperature between 1490 and 1495° C. A chuck 46 or other suitable means held one end of the cane 30. A shaft 48 coupled the chuck 48 to a motor (not shown) that rotated the cane 30. Cane 20 was driven back and forth through hot zone 44 at a constant speed, preferably about 6 mm per minute. During its traverse into and out of the muffle, the cane was rotated at a rate of about 3.5 revolutions per minute.

After the cane is heat treated, it can be overclad with silica cladding glass and be drawn into gain fiber.

The above-described OVD process could be employed to make gain fibers the cores of which have a substantially uniform radial alumina concentration of up to about 1.3 wt. %. Some crystals begin to develop along the centerline collapse region at that concentration; however, much good fiber can be drawn from the blanks. The alumina content can be greater in fibers produced by outside processes such as VAD that do not result in a centerline collapse region.

Figure 7:
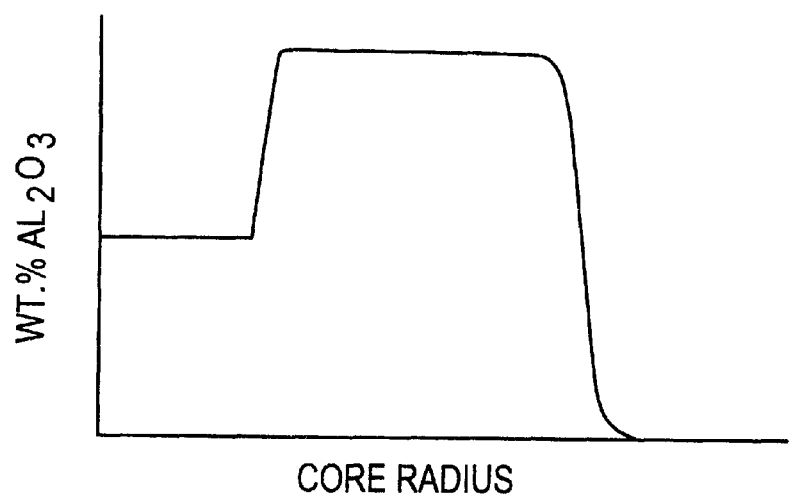
FIGS. 7 and 8 show two alumina concentration profiles.
Figure 8:
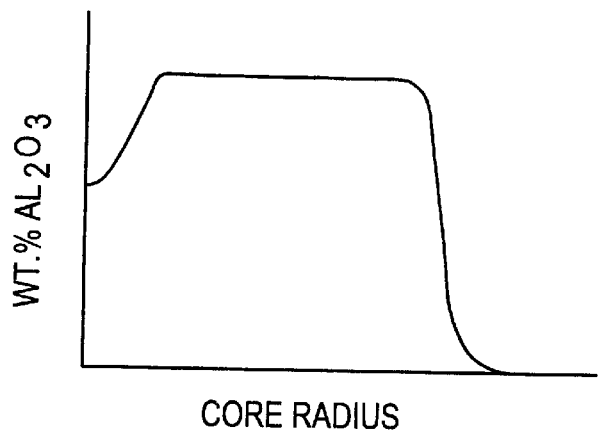

It has been discovered that gain fibers having excellent gain spectrum shape can be produced by maintaining the alumina concentration at levels up to about 2.35 wt. % in all regions of the core except the centerline collapse region where it is maintained up to about 1.3 wt. %. Two types of alumina profiles that were employed are shown in FIGS. 7 and 8.

Figure 9:
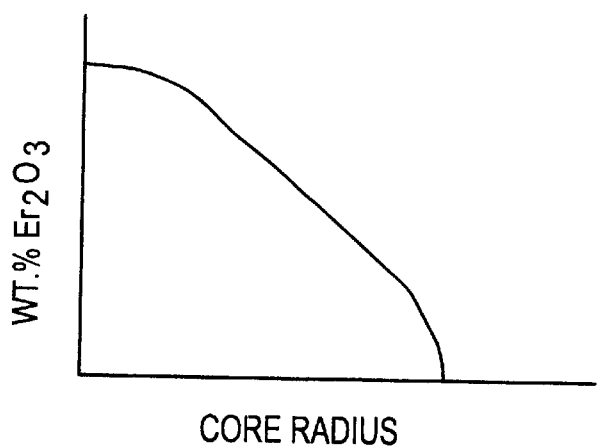
FIGS. 9 and 10 show two erbia concentration profiles.
Figure 10:
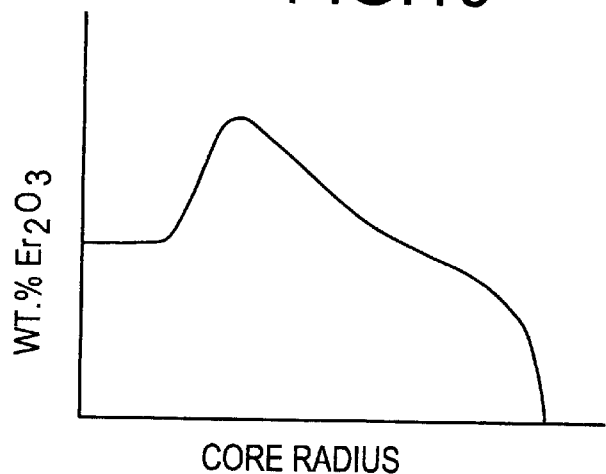

The erbia profiles were typically as shown in FIGS. 9 and 10. The area weighted average erbia concentration in the core region of the core cane was typically in the range of about 0.3 wt. % to about 0.5 wt. % for discrete amplifier fibers. However, useful amplifier fibers have been made with erbia concentrations outside this range. Distributed fiber amplifiers contain very little erbium.

The germania profiles of the fibers were step-shaped with a small concentration depression at the centerline. A sufficient amount of germania was added to the core to provide a targeted change in refractive index.

The alumina concentrations of some of the fibers of this embodiment are given in Table 2. The alumina concentrations listed are the maximum concentrations that occurred in the centerline region and in the remainder of the core. Concentrations were obtained from microprobe analysis of the cane.

TABLE 2

| Glass Preform No. | Wt. % Al₂O₃ | |
| --- | --- | --- |
| | Centerline | Core |
| 1 | 0.98 | 2.08 |
| 2 | 1.11 | 2.32 |
| 3 | 1.24 | 2.35 |
| 4 | 1.28 | 2.27 |
| 5 | 0.21 | 0.86 |
| 6 | 0.21 | 0.62 |
| 7 | 0.43 | 0.80 |
| 8 | 0.54 | 1.22 |
| 9 | 0.68 | 0.83 |

Each sintered glass preform was stretched to a glass rod that was severed into a plurality of 7 mm diameter core canes. Two of the Preform No. 3 canes were heat treated. The first heat treated cane had no crystals. The second cane from Preform No. 3 had a few clustered crystals. Four of the canes from Preform No. 4 were heat treated. One of these canes had a single crystal. The remaining three canes from Preform No. 4 had no crystals.

The principles of the present invention can be applied to the MCVD-based solution impregnation method in which a porous glass layer is sintered in helium (see U.S. Pat. No. 5,262,365 which is incorporated herein by reference). In accordance with that technique, glass having a relatively low refractive index is deposited on the inner peripheral surface of a silica glass substrate tube by means of an ordinary MCVD method to form a cladding glass layer. Each pass of the burner along the substrate tube during deposition of the cladding layer produces a sintered stratum, whereby the entire cladding layer is formed of a dense glass. A porous glass layer is deposited on the inner surface of the cladding layer by means of a MCVD method conducted at a relatively low temperature. Thereafter, a rare earth element and aluminum in solution are introduced into the pores of the core-forming porous glass layer until they are saturated with the solution. The solution-impregnated and core-forming porous layer is then dried, dehydrated and sintered in a helium gas flow to make it a non-porous, dense glass layer. The coated substrate is heated to collapse it and eliminate the central opening, and it is then drawn into fiber.

The sintered dense glass layer can be subjected to heat treatment of the type described herein to eliminate bubbles caused by trapped helium and the like. Prior to the heat treatment step, the preform is heated and stretched to decrease the cross-sectional area of the alumina containing sintered layer. Thus, the gas in the bubbles will more readily escape. The stretched heat-treated preform can be drawn into fiber.

What is claimed is:

1. A method for reducing bubbles in a glass article comprising the steps of:
   depositing glass soot which contains alumina on a substrate to form an elongated cylindrical body, at least a portion of which is porous;
   drying and sintering the porous portion of said body to convert said porous portion to a dense glass having a given cross-sectional area;
   drawing the resultant glass preform to form a glass cane in which the cross-sectional area of said dense glass is less than said given cross-sectional area, the glass cane having an initial concentration of alumina in a central core region and increases in concentration at radial distances greater than the outer radius of said central region; and
   after said drying and sintering, heat treating the cane at a high enough temperature to remove bubbles and for a short enough time to avoid crystallization of the cane.

2. The method of claim 1 wherein the step of depositing comprises depositing glass soot on the outer peripheral surface of a mandrel to build up a porous coating, and removing the mandrel.

3. The method of claim 1 wherein the step of depositing comprises depositing glass soot on the end of a target rod and building up said coating in an axial direction.

4. The method of claim 1 wherein the glass soot contains a dopant selected from the group consisting of erbium, germania and combinations thereof.

5. The method of claim 4 wherein the glass soot contains a maximum concentration of alumina which is up to about 2.35 weight percent.

6. The method of claim 1 wherein the temperature is between 1300° C. and 1500° C.

7. The method of claim 6 wherein the temperature is greater than about 1450° C.

8. The method of claim 1 wherein the cane diameter is less than about 10 mm.

9. The method of claim 8 wherein the cane diameter is between 5 mm and 7 mm.

10. A method for reducing bubbles in a glass article comprising the steps of:
    depositing glass soot on a substrate to form a porous, elongated cylindrical body having a first outer diameter, the soot contains alumina;
    drying and sintering the porous body to consolidate said porous body into a preform having a second diameter that is less than said first outer diameter;
    drawing the preform to form a core cane having a third diameter that is less than said second diameter, the glass cane having an initial concentration of alumina in a central core region and increases in concentration at radial distances greater than the outer radius of said central region; and
    after said drying and sintering, heat treating the cane at a high enough temperature to remove bubbles and for a short enough time to avoid crystallization of the cane.

11. The method of claim 10 wherein the glass soot contains a dopant selected from the group consisting of erbium, germania and combinations thereof.

12. The method of claim 11 wherein the glass soot contains a maximum concentration of alumina which is up to about 2.35 weight percent.

13. The method of claim 10 wherein the step of depositing glass soot comprises depositing a plurality of layers of soot on a mandrel to build up a coating, one or more of the first deposited layers of soot containing a first concentration of alumina, the alumina concentration of the remainder of said plurality of layers being greater than said first concentration.

14. The method of claim 13 wherein the alumina concentration in said central region is less than about 1.3% by weight, the alumina concentration increasing radially to a maximum of up to about 2.35% by weight.

* * * * *